Patented May 31, 1932

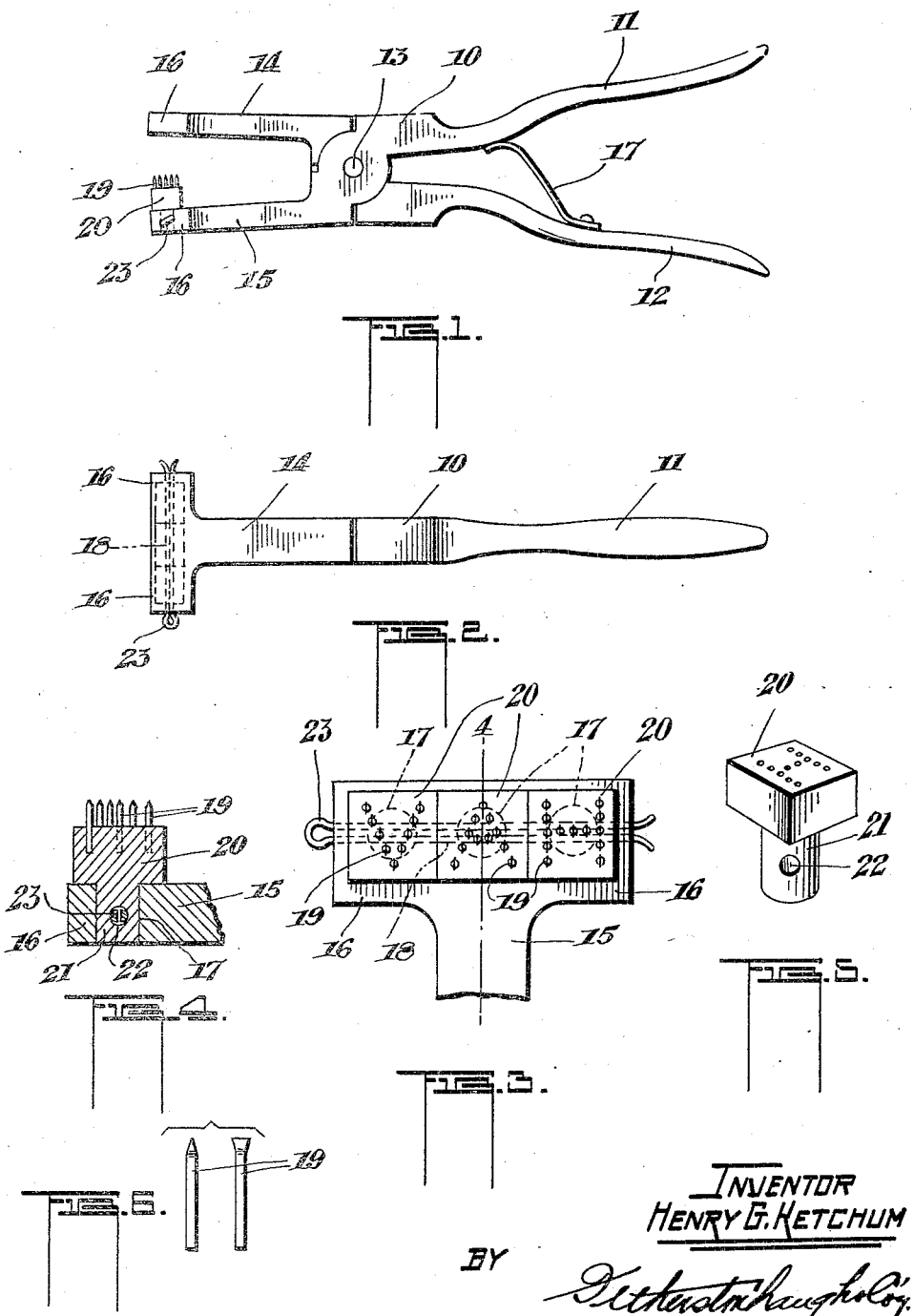

1,860,421

UNITED STATES PATENT OFFICE

HENRY GEORGE KETCHUM, OF LUZERNE, NEW YORK

ANIMAL MARKER

Application filed March 15, 1929. Serial No. 347,382.

This invention relates to improvements in animal markers and more particularly to that type of markers which are used in the tattoo method of animal identification.

The necessity for marking animals and poultry has been well established and recognized and in the case of registered animals is practically compulsory. I am aware that different methods have been adopted to effect the necessary identification including branding and the use of metal markers. I am also aware that the tattoo method has been used. There is, however, a serious objection to the latter in so far as it has already been developed in that with the form of needles in use, the ink spreads with the result that the mark is badly blurred or blotted making it indistinct and unrecognizable.

I have discovered that by forming the needles with a special chisel point this spreading of the ink is avoided and that a clear and readily distinguishable mark is provided.

One object of the invention is to provide an animal marking tool of light and durable construction composed of few parts and in which the type plates or blocks can be readily assembled and secured in position and which will, as a whole, more efficiently perform the functions required of it.

The novel features, therefore, of my improved animal marker include a pair of handle members pivoted together having integral therewith jaws substantially T-shaped at their outer ends and provided with a plurality of spaced orifices thereacross in which are designed to fit the orificed stems of type blocks adapted to be securely held in position by a cotter pin or the like, a plurality of tattoo needles in the type blocks arranged to form a desired character and each preferably containing a separate character.

Referring now to the drawings in which like characters of reference indicate corresponding parts in each figure, Figure 1 is a side elevation of an animal marker embodying the principles of my invention, Figure 2 is a top plan view thereof, Figure 3 is a fragmentary view in elevation showing the marking device arranged in position in the jaw of the marker, Figure 4 is a section on the line 4—4 of Figure 3, Figure 5 is a perspective detail of the type plate or block, Figure 6 is a detail of the chisel pointed tattoo needles.

Referring now more particularly to the drawings in which a preferred example of the device is disclosed the marker embodying the invention is indicated as a whole by the reference numeral 10 and comprises the handles 11 and 12 pivotally connected together as at 13 and having formed integral therewith the jaws 14 and 15 formed at their outer ends with transverse extensions 16. A leaf spring 17 is secured to the inside of the handle 12 and slidably engages the inside of the opposite handle 11 to normally hold the handles and jaws separated. The transverse extensions 16 of the lower jaw are provided with a plurality of spaced openings 17 communicating with one another through a longitudinally extending opening 18 extending the full length of the transverse extension, as disclosed in dotted lines in Figures 2 and 3. Within these openings 17 and designed to detachably fit therein, is the tattoo type 19 comprising a substantially rectangular block or head portion 20 in the jaws formed with a stem 21 adapted to engage with the openings 17 and having therethrough an opening 22 registering with the opening 18 to engage with securing means, here shown in the form of a cotter pin 23, for holding the tattoo type blocks together.

In operation the tattoo identification mark is placed on the inside of an animal's ear or, in the case of poultry, on a portion of the skin.

The tattoo type block is arranged in the opening 17 in the lower jaw and fastened together by the cotter pin 23. The place to be marked is thoroughly cleaned and the ear of the animal is then inserted between the jaws with the letters on the inside of the ear. The jaws are then firmly closed and the needles operated to puncture the ear. The handles of the marker are released and the instrument removed. Tattoo ink is thoroughly smeared over the puncture made by the chisel pointed needles and instead of spreading around them follows the line of such points to provide a clear distinct mark without any blots or blurs. As the punctures heal the skin grows over the tattoo ink leaving the mark permanent inside the animal's ear.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:—

An animal marking tool comprising two pivotally connected members, each having a jaw at one side of the pivot and a handle at the other side thereof, shoes, integral with the free ends of the jaws, formed with holes therein, and a bore therethrough, type blocks formed with squared heads and rounded stems having openings therethrough adapted to detachably fit within the shoes, the openings in the type blocks registering with the bore through the shoe to engage with suitable retaining means extending therethrough and operable from without the shoe whereby the retaining means are slidably operable from without the shoe to selectively or collectively retain the type blocks in the shoe.

In witness whereof I have hereunto set my hand.

HENRY G. KETCHUM.